(12) United States Patent
Sgobba et al.

(10) Patent No.: US 11,263,527 B2
(45) Date of Patent: Mar. 1, 2022

(54) COGNITIVE SWITCHING LOGIC FOR MULTIPLE KNOWLEDGE DOMAINS

(71) Applicant: Kyndryl, Inc., New York, NY (US)

(72) Inventors: Nicolo' Sgobba, Brno (CZ); Erik Rueger, Ockenheim (DE); Guillermo Rodriguez de Vera Beltri, Brno (CZ)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/808,877

(22) Filed: Mar. 4, 2020

(65) Prior Publication Data

US 2021/0279563 A1     Sep. 9, 2021

(51) Int. Cl.
*G06N 3/08*     (2006.01)
*G06F 40/30*    (2020.01)

(52) U.S. Cl.
CPC .............. *G06N 3/08* (2013.01); *G06F 40/30* (2020.01)

(58) Field of Classification Search
CPC ................................. G06N 3/08; G06F 40/30
See application file for complete search history.

(56) References Cited

U.S. PATENT DOCUMENTS

| | | | |
|---|---|---|---|
| 10,339,925 B1 | 7/2019 | Raslrow et al. | |
| 10,445,656 B2 | 10/2019 | Sanchez et al. | |
| 2008/0319751 A1 | 12/2008 | Kennewick et al. | |
| 2016/0193732 A1 | 7/2016 | Breazeal et al. | |
| 2019/0036775 A1* | 1/2019 | Ahmad | H04L 67/306 |
| 2019/0236130 A1 | 8/2019 | Li et al. | |
| 2019/0324780 A1* | 10/2019 | Zhu | G06F 3/017 |

(Continued)

FOREIGN PATENT DOCUMENTS

| WO | 2018208506 A1 | 11/2018 |
|---|---|---|
| WO | 2018208514 A1 | 11/2018 |

OTHER PUBLICATIONS

Anonymous, "Cognitive system and method to perform a context switch between knowledge domains in a knowledge domains explorer," an IP.com Prior Art Database Technical Disclosure, IP.com No. IPCOM000258841D, Jun. 19, 2019, 3 pgs.

(Continued)

*Primary Examiner* — Kevin Ky
(74) *Attorney, Agent, or Firm* — Erik Swanson, Esq.; Kevin P. Radigan, Esq.; Heslin Rothenberg Farley & Mesiti P.C.

(57) ABSTRACT

A method provides a set of predicted responses to a user. The method includes receiving a message from a user, the message having natural language information. The method includes processing, using cognitive switching logic (CSL), the natural language information and information from previous messages from the user. The method includes identifying, using CSL, a context of the natural language information based on the information from the previous messages. The method includes identifying, using CSL, at least one knowledge domain which contains a response to the message, based on the identified context and on user persona information. The method includes retrieving a response from each identified knowledge domain. The method further includes, in response to retrieving more than one response, transmitting feedback to CSL to refine identifying the at least one knowledge domain until only one response is retrieved. The method further includes presenting the one response to the user.

12 Claims, 7 Drawing Sheets

(56) References Cited

U.S. PATENT DOCUMENTS

2020/0042880 A1\* 2/2020 Bhattacharya ....... G06Q 30/016
2020/0242198 A1\* 7/2020 Ji ........................... G10L 15/22

OTHER PUBLICATIONS

Desmarais, C. "IBM Watson Conversation—Multiple Workspace Orchestration, Part Two," https://medium.com/ibm-watson/ibm-watson-conversation-multiple-workspace-orchestration-part-two-88f1d57d8a62, printed Dec. 5, 2019, 8 pgs.

Desmarais, C., "IBM Watson Conversation—Multiple Workspace Orchestration, Part One," https://medium.com/ibm-watson/ibm-watson-conversation-multiple-workspace-orchestration-d51f003f5d11, printed Dec. 5, 2019, 2 pgs.

IBM, "IT service desk solutions," https://www.ibm.com/services/digital-workplace/watson-support, printed Dec. 5, 2019, 8 pgs.

\* cited by examiner

COGNITIVE SWITCHING LOGIC FOR MULTIPLE KNOWLEDGE DOMAINS

BACKGROUND

The present disclosure relates generally to data processing systems, and more particularly, to a computer-implemented method for providing a set of predicted responses to a user.

Virtual assistants can be used to reduce the workload of human agents. For example, virtual assistants can be used to answer and route phone calls by using natural language processing technologies.

SUMMARY

Embodiments of the present disclosure include a method, a computer program product, and a system for providing a set of predicted responses to a user. The method includes receiving a message from a user, the message having natural language information. The method further includes processing, using cognitive switching logic, the natural language information of the message and information from previous messages from the same user. The method further includes identifying, using the cognitive switching logic, a context of the natural language information of the message based on the information from the previous messages. The method further includes identifying, using the cognitive switching logic, at least one knowledge domain which contains a response to the message, based on the identified context and on user persona information. The method further includes retrieving a respective response from each identified knowledge domain. The method further includes, in response to retrieving more than one respective response, transmitting feedback to the cognitive switching logic to refine identifying the at least one knowledge domain until only one response is retrieved. The method further includes presenting the one response to the user The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain principles of the disclosure. The drawings are only illustrative of typical embodiments and do not limit the disclosure.

Figure 1:
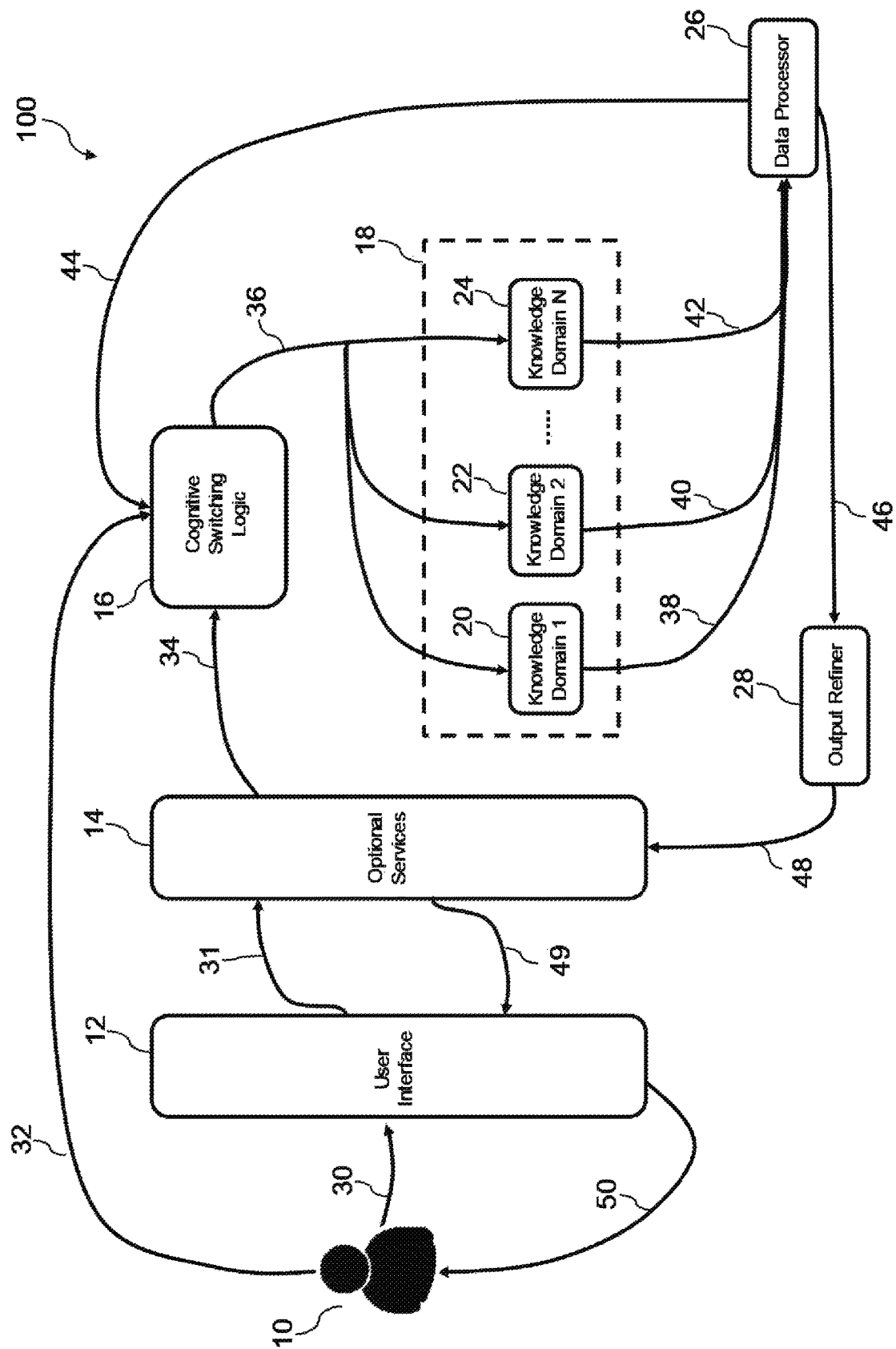
FIG. 1 depicts a high-level system architecture for applying the computer-implemented method for providing a set of predicted responses to a user, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

In customer assistance, it is advantageous to achieve gains in operational efficiency by reducing the number of interactions with human agents, for example phone calls received by human agents at a service desk, by making use of virtual assistants. Such virtual assistants are usually trained on the topics for which the service desk is laboriously involved. Managing an application which uses such a virtual assistant at its core for this purpose can become challenging if the orchestration layer of the application is not properly designed. It is possible to design the orchestration layer in a manner such that a virtual assistant may organize what it knows and be trained on some sorts of containers named skills or knowledge domains, where each of these domains includes content that pertains to the same topic.

Natural Language Understanding and Natural Language Processing (NLU, NLP) technologies serve as a foundation for natural language powered self-service solutions that deliver higher flexibility, efficiency, and customer satisfaction than traditional support solutions, such as a call to a service desk human agent. NLU and NLP enable smarter and more efficient applications that can quickly route callers through self-service channels and enhance the customer experience throughout the entire self-service engagement.

Natural language powered self-service/self-help solutions usually use a multi-classifier NLP model, which requires unique keywords to each knowledge domain to facilitate a switch from one domain to another. These solutions require having their own "knowledge domain switching logic" of unique keywords to be managed, maintained, and synchronized across multiple knowledge domains seamlessly. Currently, the following three approaches are used.

In the Entity-based Routing Approach, the dispatching logic uses a routing approach which relies on entities to perform disambiguation. When a customer's question contains any keyword that is defined in the disambiguation entity, the dispatcher will identify that word and send the question to the defined skill associated with that identified word.

In the Waterfall Approach, the dispatching logic uses a routing approach which relies on a linear and sequential model. The Waterfall Approach can be utilized when various knowledge domains are clearly prioritized. For example, there may exist two knowledge domains: one that handles business processes, and another one for general questions.

In the Spray Approach, the parent/child relationship that is used in the above two approaches is skipped. Instead, in the Spray Approach, the customer's utterance is sent to all of the knowledge domains and the intent which was recognized that scored the highest confidence is received back. This approach requires the least effort to implement because the approach does not rely on relationships of the knowledge domains, so the knowledge domains can be maintained separately.

The illustrative embodiments described herein include a method for providing a set of predicted responses to a user, wherein at one or more electronic devices with one or more processors and memory, one or more messages comprising unstructured natural language information from at least one user are received. The unstructured natural language information of the one or more messages is analyzed to determine, based on the analysis of the unstructured natural language information, whether one or more predicted responses are to be provided to the user from a plurality of sets of candidate predicted responses.

The illustrative embodiments may be used for the method comprising: (i) training a neural network with an initial set of natural language information for multiple knowledge domains; (ii) retraining the neural network based on user feedback and user persona metadata; (iii) determining a natural language information; (iv) in response to the determined natural language information, using the trained neural network to determine at least one knowledge domain; and (v) determining if retraining can be skipped by ignoring context-specific natural language information to forget about at least a topic for at least one user.

For providing predicted responses to a user utterance, once all the different skills are defined based on a client IT environment, a component may be used to identify and understand the context of the natural language information from the user utterance and to decide on the appropriate knowledge domain to send the user questions to. This component behaves therefore as a cognitive switching logic or a so-called "cognitive dispatcher".

Additionally, the present disclosure enables forgetting about previously learned "cognitive links" to improve, over time, the accuracy of the cognitive switching logic. Therefore, a system and method to improve the context switching between the knowledge domains in a knowledge domain explorer by using a cognitive switching logic is proposed.

The illustrative embodiments are sometimes described herein using particular technologies only as an example for the clarity of the description.

In the drawings, like elements are referred to with equal reference numerals. The drawings are merely schematic representations, not intended to portray specific parameters of the present disclosure. Moreover, the drawings are intended to depict only typical embodiments of the present disclosure and therefore should not be considered as limiting the scope of the present disclosure.

FIG. 1 depicts a high-level system architecture 100 for applying the computer-implemented method for providing a set of predicted responses 50 to a user 10, according to some embodiments of the present disclosure. According to the system architecture 100 depicted in FIG. 1, a user 10 uses the user interface 12 to interact with the system and to provide as input natural language information from a user utterance 30. Optional services 14 can process the natural language information 31 from the user utterance (for instance, grammar check or translation services may be required) before sending refined natural language information 34 to a cognitive switching logic 16. The cognitive switching logic 16 processes the refined natural language information 34 and sends it to the set or to a subset of knowledge domains 20, 22, 24 based on a cognitive decision. A number N of knowledge domains 20, 22, 24 may be implemented.

A domains model 18 is a set of cognitive systems and generates an output which a data processor 26 uses to refine the cognitive switching logic 16 training set and to generate data as a raw output 46 for an output refiner 28. The refined output 48 generated by the output refiner 28 is sent back to the optional services 14 for further processing (for instance, translating, if translation services are required). Processed refined output 49, after being processed and refined for presentation by the user interface 12, is presented back to the user 10. Finally, a predicted response 50 is provided to the user 10.

Advantageously, the computer-implemented method provides a set of predicted responses 50 to a user 10 responsive to one or more messages 30 comprising unstructured natural language information being received from the user 10. The unstructured natural language information of the one or more messages 30 is analyzed to determine, based on the analysis of the unstructured natural language information, whether one or more predicted responses 50 are to be provided to the user 10 from a plurality of sets of candidate predicted responses.

Figure 2:
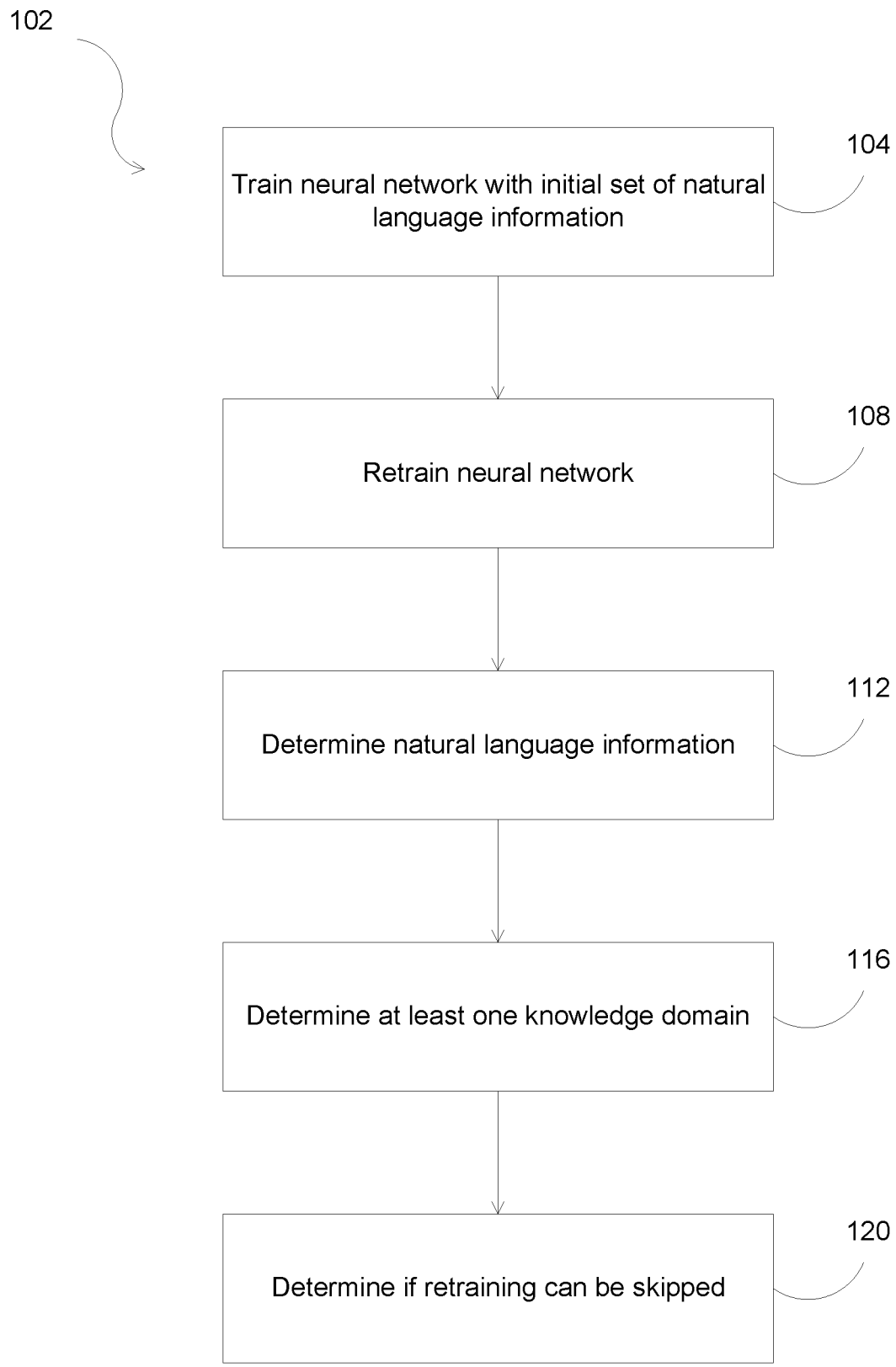
FIG. 2 depicts a flowchart of an example method for providing a set of predicted responses to a user, in accordance with embodiments of the present disclosure.

Referring now to FIG. 2, illustrated is a flowchart of an example method 102 for providing a set of predicted responses to a user, in accordance with embodiments of the present disclosure. With reference to FIGS. 4-7, the method 102 begins with operation 104, wherein a neural network 60, 70 is trained with an initial set of natural language information 31 for multiple knowledge domains 20, 22, 24. At operation 108, the neural network 60, 70 is retrained based on user feedback and user persona metadata. At operation 112, a natural language information 31 is determined. At operation 116, in response to the determined natural language information 31, the trained neural network 60, 70 is used to determine at least one knowledge domain 20, 22, 24. At operation 120, it is determined if retraining can be skipped by ignoring context-specific natural language information 31 for at least one user 10.

More specifically, FIG. 2 depicts an example computer-implemented method 102 for providing a set of predicted responses (e.g., 50) to a user (e.g., 10), wherein at one or more electronic devices with one or more processors and memory, one or more messages comprising unstructured natural language information (e.g., 30) from at least one user (e.g., 10) are received, wherein the unstructured natural language information (e.g., 30) of the one or more messages is analyzed to determine, based on the analysis of the unstructured natural language information (e.g., 30), whether one or more predicted responses (e.g., 50) are to be provided to the user (e.g., 10) from a plurality of sets of candidate predicted responses.

The method 102 includes, at operation 104, training a neural network (e.g., 60, 70) with an initial set of natural language information (e.g., 30) for multiple knowledge domains (e.g., 20, 22, 24). The method 102 further includes, at operation 108, retraining the neural network (e.g., 60, 70) based on user feedback and user persona metadata. The method 102 further includes, at operation 112, determining a natural language information (e.g., 30). The method 102 further includes, at operation 116, in response to the determined natural language information (e.g., 30), using the trained neural network (e.g., 60, 70) to determine at least one knowledge domain (e.g., 20, 22, 24). The method 102 further includes, at operation 120, determining if the retraining step can be skipped by ignoring context-specific natural language information (e.g., 30) to forget about at least a topic for at least one user (e.g., 10).

In at least one embodiment of the present disclosure, in the method 102, the retraining step is skipped by providing at least one forget gate (e.g., 69) in the neural network (e.g., 60, 70). In at least one embodiment of the present disclosure, in the method 102, the neural network (e.g., 60, 70) is configured as a recurrent neural network or a convolutional neural network.

In at least one embodiment of the present disclosure, in the method 102, the neural network (e.g., 60, 70) comprises at least three layers including: a generic model (e.g., 92), based on generic metadata; a knowledge domains model (e.g., 18), based on previously available metadata; and a user model (e.g., 94), based on user persona and/or user specific metadata. Furthermore, in at least one embodiment of the present disclosure, the generic model (e.g., 92) is a common model, and remembers previous inputs and context in order to predict the knowledge domain (e.g., 20, 22, 24) for a new input. Furthermore, in at least one embodiment of the present disclosure, the knowledge domains model (e.g., 92) predicts subtopics within the knowledge domain (e.g., 20, 22, 24) for the user input, and remembers previous input and/or answers to predict the answer and/or possible next input. Furthermore, in at least one embodiment of the present disclosure, the user model (e.g., 94) refines the knowledge domains (e.g., 20, 22, 24) and the predicted responses (e.g., 50) and/or learns about user choices.

In at least one embodiment of the present disclosure, in the method 102, the neural network (e.g., 60, 70) is trained in an initial scenario comprising a common model for identifying the at least one knowledge domain (e.g., 20, 22, 24) based on a generic set of refined natural language information on the multiple knowledge domains (e.g., 20, 22, 24).

In at least one embodiment of the present disclosure, in the method 102, the neural network (e.g., 60, 70) is trained in a typical scenario comprising at least one of: previous N inputs metadata; the user persona metadata to predict the at least one knowledge domain (e.g., 20, 22, 24) from where the predicted response (e.g., 50) to a given natural language information (e.g., 30) can be retrieved; the context metadata shared among the available knowledge domains (e.g., 20, 22, 24) from where the answer to a given natural language information (e.g., 30) can be retrieved; a user feedback; and a penalizing factor to re-adjust the weighting factors based on the given user feedback.

In at least one embodiment of the present disclosure, in the method 102, a cognitive switching logic (e.g., 16) between the knowledge domains (e.g., 20, 22, 24) is provided which introduces the capability to forget about data, information, or cognitive links without re-training. Furthermore, the cognitive switching logic (e.g., 16), which is based on user context data (e.g., 32), is applicable to at least one of: a single user (e.g., 10); a subset of users (e.g., 10); or all users (e.g., 10). Furthermore, the cognitive switching logic (e.g., 16) is based on at least one of: user metadata; natural language information (e.g., 30); user context data (e.g., 32); context data from optional services (e.g., 14); context from the knowledge domains model (e.g., 20, 22, 24); or a level of confidence (e.g., 38, 40, 42) of the predicted response (e.g., 50). Furthermore, the cognitive switching logic (e.g., 16) is configured to: receive a natural language information (e.g., 30); process the natural language information (e.g., 30) and search for previous N inputs; identify the context of the current natural language information (e.g., 30) based on the past N inputs; determine the at least one knowledge domain (e.g., 20, 22, 24) from where a predicted response (e.g., 50) can be retrieved, using the context with the user persona; retrain the neural network (e.g., 60, 70) based on the user feedback if more than one knowledge domains (e.g., 20, 22, 24) are identified for predicted response (e.g., 50) to be retrieved; present the predicted response (e.g., 50) to the user (e.g., 10) and receive a user feedback for retraining the neural network (e.g., 60, 70); and create a penalizing factor to re-adjust weighting factors of the neural network (e.g., 60, 70) if the predicted response (e.g., 50) is wrong for a single user, a subset of users, or all the users.

In at least one embodiment of the present disclosure, in the method 102, the natural language information (e.g., 30) is refined by optional services (e.g., 14) before being transmitted to the cognitive switching logic (e.g., 16).

In at least one embodiment of the present disclosure, in the method 102, the predicted response (e.g., 50) from the at least one knowledge domain (e.g., 20, 22, 24) is sent to a data processor (e.g., 26) which transmits an optional feedback (e.g., 44) as training data to the cognitive switching logic (e.g., 16).

In at least one embodiment of the present disclosure, the predicted response (e.g., 50) is refined by an output refiner (e.g., 28) before being presented to the user (e.g., 10).

Referring again to FIG. 1, in a standard scenario, the cognitive switching logic 16 uses the above-described Spray Approach when it is not trained on a given natural language information. Therefore, the cognitive switching logic 16 broadcasts the refined natural language information 34 to all the knowledge domains 20, 22, 24 via branch 36, and learns from this interaction. Subsequently, the given natural language information is identified as being something on which the cognitive switching logic 16 was previously trained. Then, the cognitive switching logic 16 uses the Router Approach, routing the refined natural language information 34 directly to an appropriate knowledge domain 20, 22, 24 based on a confidence level identified from all previous interactions. Over multiple iterations, this process significantly reduces the number of the needed knowledge domains 20, 22, 24 to be queried at each interaction, thereby reducing and optimizing overall computational cost and pricing.

The cognitive switching logic 16 leverages the capabilities of neural networks and makes decisions on which of the knowledge domains 20, 22, 24 the answer would really come from and learns based on the user's persona. The related and most relevant metadata values or features to train the neural network of the cognitive switching logic 16 may include, but are not limited to, the following features reported in the following table:

| | |
|---|---|
| 1 | User data (e.g. Gender, Category, Native Language, Current Job Role, Geography, Education . . .) |
| 2 | Natural Language Information metadata (e.g. Utterance length, Language, Translation, Spellcheck, Keywords, . . .) |
| 3 | Context Data (e.g. Past Interactions, History, User feedback, Location, Weather, Device, Interaction Category, . . .) |
| 4 | Context from Optional Services 14 (e.g. Translated User Utterance, Refined User Utterance, Language Processing metadata, . . .) |
| 5 | Context from Domains model 18 (e.g. Intents, Entities, Functions, Features, Conversation model, . . .) |
| 6 | Level of confidence of the identified content returned by the Data Processor 26 |
| . . . | . . . |

The cognitive switching logic 16 initially may be trained with a common model to identify the knowledge domains 20, 22, 24 based on a generic set of refined natural language information 34 on all the knowledge domains 20, 22, 24.

This may give a jump start to the learning curve of the cognitive switching logic 16, like an onboarding process. This ensures that the cognitive switching logic 16 limits the spray to a limited set of knowledge domains 20, 22, 24 based on the refined natural language information 34 from the user 10.

In a typical scenario, any natural language information 31 from the user 10 has a temporal relationship. For example, a user 10 may provide a first utterance 30 such as: "How do I install Office365 on my laptop?" The user 10 then follows the steps provided by the solution to the given refined natural language information 34. Next, the user 10 may follow up with further refined natural language information 34 that, given the context of the example could typically be a second utterance 30 such as: "How do I signup?" It may be noted that there is a relationship between the first and second utterances. This relationship is referred to as time-based or temporal relation.

Recurrent Neural Networks (RNN) or Convolutional Neural Networks (CNN) may be appropriate tools to handle this situation. According to embodiments of this disclosure, a variation in RNN methodology is proposed to create the cognitive switching logic 16.

More specifically, the neural network 60, 70 may be trained in an initial scenario comprising a common model for identifying the at least one knowledge domain 20, 22, 24 based on a generic set of refined natural language information on the multiple knowledge domains 20, 22, 24.

The neural network 60, 70 may be trained in a typical scenario comprising at least one of: previous N inputs metadata; the user persona metadata to predict the at least one knowledge domain 20, 22, 24 from which the predicted response to a given natural language information 31 can be retrieved; the context metadata shared among the available knowledge domains 20, 22, 24 from which the answer to a given natural language information 31 can be retrieved; a user feedback; and a penalizing factor to re-adjust the weighting factors based on the given user feedback.

In at least one embodiment of the present disclosure, the cognitive switching logic 16 between the knowledge domains 20, 22, 24 further introduces the ability to forget about data, information, or cognitive links without re-training. Accordingly, retraining processes may be skipped by providing at least one forget gate 69 in the neural network 60, 70.

The cognitive switching logic 16 may be based on at least one of: user metadata; natural language information 31; user context data 32; context data from optional services 14; context from the knowledge domains model 20, 22, 24; and a level of confidence 38, 40, 42 of the predicted response 50.

In at least one embodiment of the present disclosure, the cognitive switching logic 16 is further configured to receive natural language information 31; process the natural language information 31, and search for previous N inputs; identify the context of the current natural language information 31 based on the past N inputs; determine the at least one knowledge domain 20, 22, 24 from which a predicted response can be retrieved, using the context with the user persona; retrain the neural network 60, 70 based on the user feedback if more than one knowledge domain 20, 22, 24 is identified for predicted response to be retrieved; present the predicted response 50 to the user 10 and receive a user feedback for retraining the neural network 60, 70; and create a penalizing factor to re-adjust weighting factors of the neural network 60, 70 if the predicted response 50 is wrong for a single user, a subset of users, or all the users.

In at least one embodiment of the present disclosure, the predicted response from the at least one knowledge domain 20, 22, 24 may be sent to a data processor 26 which transmits an optional feedback 44 as training data to the cognitive switching logic 16.

Figure 4:
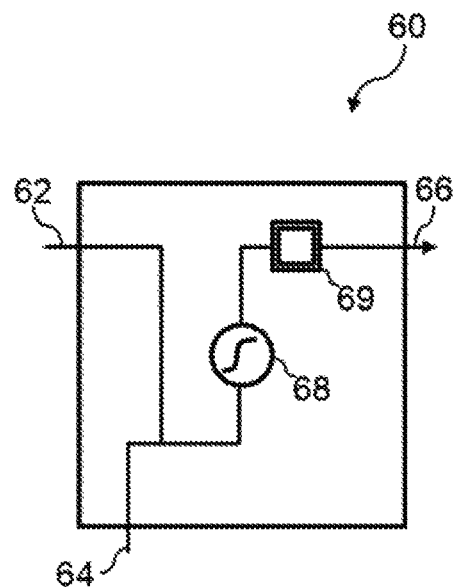
FIG. 4 depicts a simplified recurrent neural network cell with a forget gate, in accordance with embodiments of the present disclosure.
Figure 5:
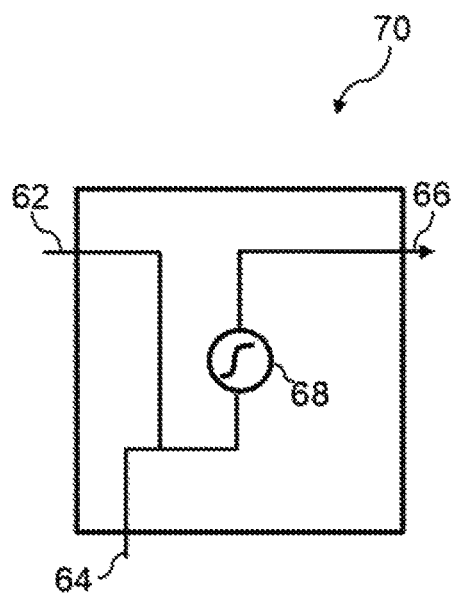
FIG. 5 depicts a simplified recurrent neural network cell, in accordance with embodiments of the present disclosure.

FIG. 4 depicts a simplified recurrent neural network cell 60 with a forget gate 69 according to some embodiments of the present disclosure, whereas FIG. 5 depicts a simplified recurrent neural network cell 70 without a forget gate 69. Each of the cells 60, 70 includes a user input 64, an input for context data 62, and an output 66. The cells 60, 70 are operated with an activation function 68, for example a tanh function (hyperbolic tangent function).

Figure 6:
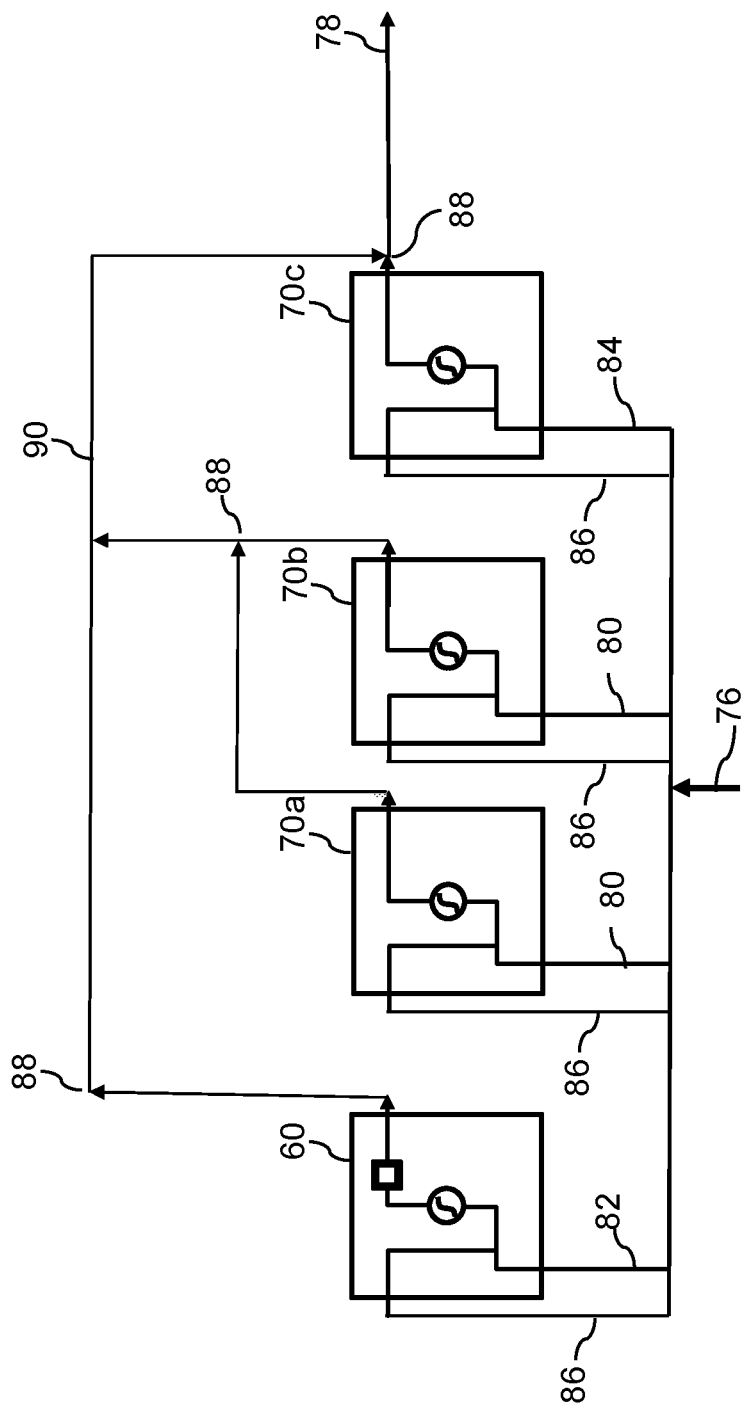
FIG. 6 depicts an overview of the memorization process, in accordance with embodiments of the present disclosure.

In the RNN, the temporal sequence is considered. Here the Xt is the input at time 't'. The Neural Network remembers the previous input sent at time 't−1' and so on and so forth. FIG. 6 depicts this remembering process, giving an overview of the memorization process according to some embodiments of the present disclosure. More specifically, FIG. 6 depicts a recurrent neural network (RNN) comprising a number of neural net cells 60, 70a, 70b, 70c, where cell 60 is implemented with a forget gate 69 (such as that shown in FIG. 4), and cells 70a, 70b, 70c are cells without a forget gate (such as is shown in FIG. 5). Combined input 76 is given to the RNN as user input and context data as hidden states 86. User input is fed to the input gates 80 of the RNN cells 70a, 70b, is fed to a penalization gate 82 of the RNN cell 60, and is fed to the output gate 84 of the RNN cell 70c. Output of the RNN cells is linked by multiplications 88 and addition 90 to the final output 78 of the RNN.

Similar to the remembering process, in at least some embodiments of the present disclosure, the RNN is also capable of a forgetting process. The proposed cognitive switching logic 16 may therefore work as follows:

Processed user utterance as refined natural language information 34 at a time T is sent to the cognitive switching logic 16. The cognitive switching logic 16 processes the refined natural language information 34 sent at time 't' and at the same time, for that user 10, it also looks back the previous 'n' inputs.

The cognitive switching logic 16 identifies the context of the current inputted refined natural language information 34 based on a number of previous inputs, also referred to herein as past 'n' inputs. The cognitive switching logic 16 uses the context along with the user 10 persona to predict the knowledge domain(s) 20, 22, 24 from which the answer to a refined natural language information 34 can be retrieved. If the cognitive switching logic 16 identifies more than one knowledge domain 20, 22, 24 from which the cognitive switching logic 16 can provide the answer, then the cognitive switching logic 16 gets the refined natural language information 34 and feeds it back into its learning system.

The cognitive switching logic 16 presents the answer from a knowledge domain 20, 22, 24 and gets the user 10 feedback for further fine tuning of the model. If the provided answer is wrong, then the cognitive switching logic 16 also creates a penalizing factor to re-adjust the weighting factors accordingly.

Figure 7:
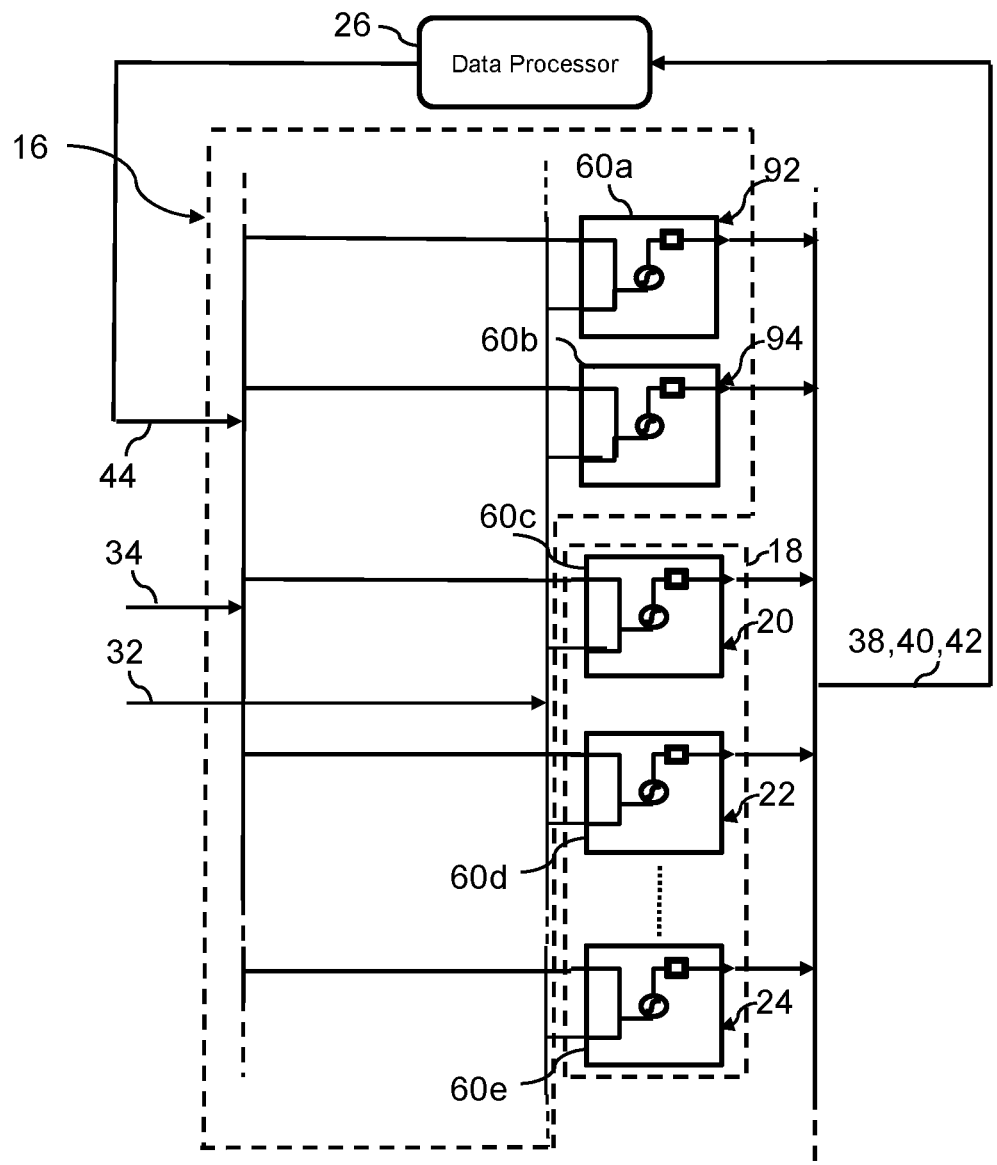
FIG. 7 depicts an overview of the architecture of the recurrent neural network of the cognitive switching logic, in accordance with embodiments of the present disclosure.

Advantageously, the method may use an n-layered model. In some embodiments, n equals three, such that the method uses three layers. In alternative embodiments, n is not limited to three, such that the method is not limited to three layers. As shown in FIG. 7, the neural network 60, 70 therefore may comprise at least three layers comprising: a generic model 92, based on generic metadata; a knowledge domains model 18, based on previously available metadata; and a user model 94, based on user persona and/or user specific metadata. The models 92, 18, 94 are represented in FIG. 7 by RNN cells 60*a*, 60*b*, 60*c*, 60*d*, and 60*e*.

Layer one, which may be referred to as the "foundation model" or "generic model" 92, is the common model across the entire system. This model does not have any personalization, but it does remember previous inputs and context to predict the knowledge domain 20, 22, 24 for a new input.

Layer two, which may be referred to as the "knowledge domains model" 18 is over and above the common model. This model predicts subtopics, such as, for example: feature, function, action, within the knowledge domain for the user input. Here, the network remembers a previous input/answer to predict the answer as well as the possible next input.

Layer three, which may be referred to as the "user model" 94, focuses on personalization considering various attributes of the user 10 and uses this to further refine the knowledge domains 20, 22, 24 and the answers coming from these to improve its precision. This model continuously learns about user choices, which helps it to give more personalized answers to the user 10.

Every layer may also use reinforcement learning. For example, the user model layer 94 uses reinforcement learning to penalize on certain knowledge domains 20, 22, 24 and answers to a given utterance from the user 10. Every layer is connected to take inputs so that it can learn which user feedbacks are genuine. For example, the bottom layers may penalize certain top layers by reducing the weighting factors, so that the inputs from it get less weight compared to other layers. This helps remove inputs from certain top layers which may be heavily biased. For example, certain user 10 feedback may be very biased and should be given less weight, and this can be achieved through layered reinforcement.

In other words, the proposed cognitive switching logic 16 has the capability to forget about certain specific topics for single users, a subset of users, or for all the users, based on the context data or information.

As used herein, the term "forgetting" means eliminating any known cognitive path to an answer. By checking the context data or information, a decision taken for a single user could be extended to all users or to a specific subset of users. For instance, if a user generally asks questions about Windows, the cognitive dispatcher returns an answer about Windows 7 based on context data, and the user provides a positive feedback. The next time the same user asks a similar question without specifying the OS version, an answer will be returned "asking" to the Windows 7 knowledge domain based on the previous interactions. However, if after some time, for example 3 months, the user asks again a similar question, he/she may get that same answer, but this time provide negative feedback. The current path may then be forgotten for the given user and, based on the new context data, for example this time Windows 10, it could be determined that this decision to forget can be applicable for all users or for a specific subset of users, thereby avoiding any re-training mechanism.

This process is depicted in FIG. 7, which provides an overview of the architecture of the RNN of the cognitive switching logic 16 according to some embodiments of the present disclosure. As shown, the cognitive switching logic 16 comprises one RNN cell 60*a* where the generic model 92 is implemented and one RNN cell 60*b* where the user model 94 is implemented. The domains model 18 comprises three RNN cells 60*c*, 60*d*, 60*e* representing three knowledge domains 20, 22, 24, respectively. Inputs for user context data 32 and refined natural language information 34 as well as user feedback as training data 44, processed by the data processor 26, are provided to the cognitive switching logic 16.

For a given refined natural language information 34, if the cognitive switching logic 16 identifies a knowledge domain 20, 22, 24 or a subset of those, the refined natural language information 34 is sent to them first. Over time, this enables the cognitive switching logic 16 to send the refined natural language information 34 directly to the appropriate knowledge domain 20, 22, 24.

If the cognitive switching logic 16 is unable to make a cognitive decision, it sends the refined natural language information 34 to all the knowledge domains 20, 22, 24 by broadcasting, and it uses the input data and context to train the cognitive switching logic 16 neural network(s) and generate the new appropriate weighting factors. The whole process is iterative and provides feedback which the cognitive switching logic 16 uses to learn from every interaction with the user 10.

Some embodiments of the present disclosure include, without limitation, the following advantages:

The proposed method is less complex to implement compared to the Router and Waterfall Approaches.

No additional training is required for the domains model 18.

The cognitive switching logic 16 improves over time, reducing the number of needed knowledge domains 20, 22, 24 to be queried at each interaction.

Queries can be sent to multiple knowledge domains 20, 22, 24 in case the cognitive switching logic 16 finds different matches within different knowledge domains 20, 22, 24.

The decisions, so the accuracy, of the cognitive switching logic 16 is refined over time.

Previous wrong training may be forgotten.

The user interface 12, the optional services 14, the domains model 18, the knowledge domains 20, 22, 24, the data processor 26, and the output refiner 28 are supportive components for the proposed system and the cognitive switching logic 16.

Figure 3:
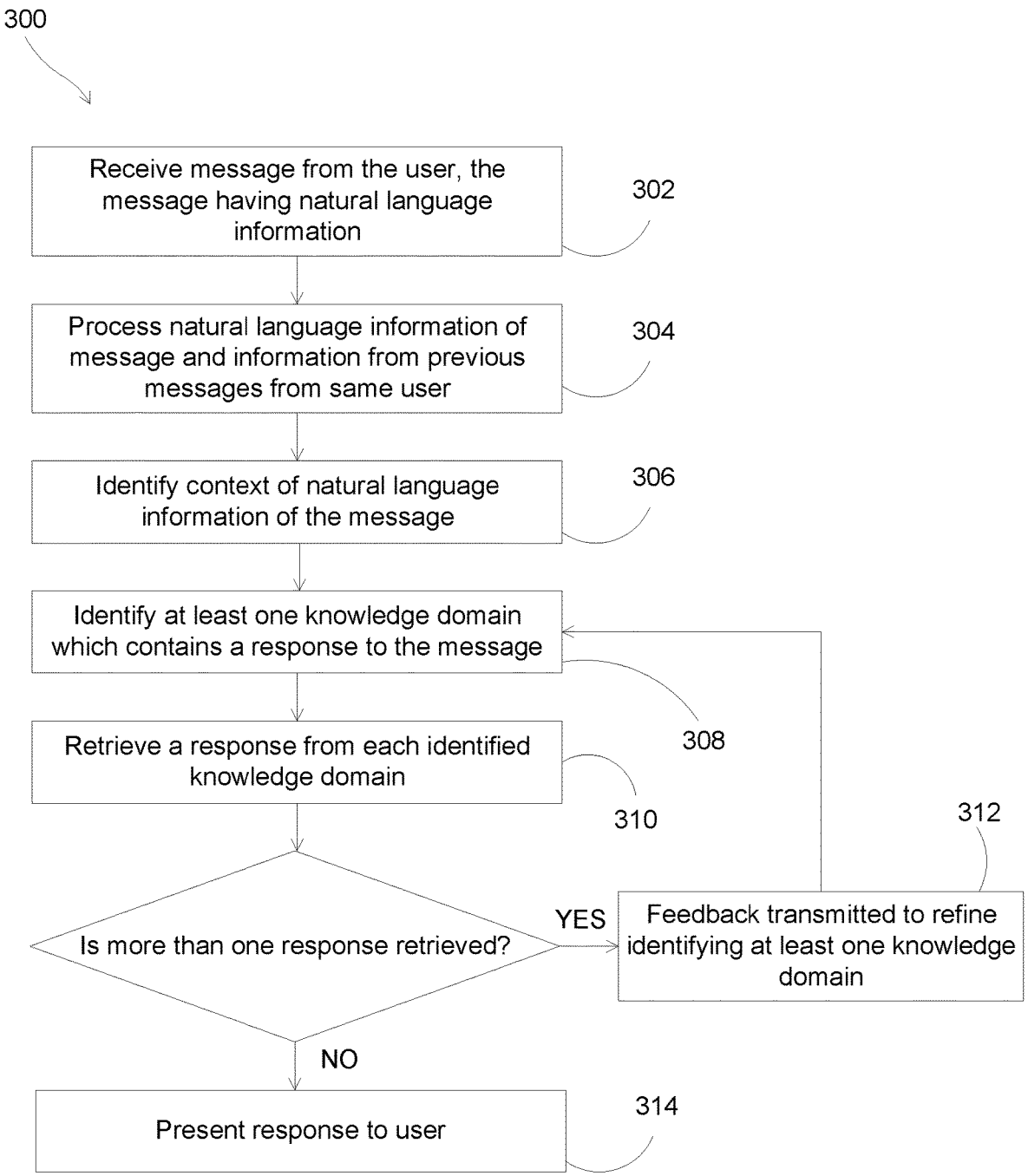
FIG. 3 depicts a flowchart of an example method for providing a set of predicted responses to a user, in accordance with embodiments of the present disclosure.

Referring now to FIG. 3, illustrated is a flowchart of an example method 300 for providing a set of predicted responses to a user, in accordance with embodiments of the present disclosure. The method 300 begins with operation 302, wherein a message is received from a user. For example, the message can be substantially similar to the user utterance 30 shown in FIG. 1, and the user can be substantially similar to the user 10 shown in FIG. 1. The message includes natural language information.

At operation 304, using a cognitive switching logic, the natural language information of the message and information from previous messages from the same user are processed. For example, the cognitive switching logic can be substantially similar to the cognitive switching logic 16 shown in FIG. 1. At operation 306, using the cognitive switching logic, a context of the natural language information of the message is identified based on the information from the previous messages.

At operation 308, using the cognitive switching logic, at least one knowledge domain which contains a response to the message is identified based on the identified context and on user personal information. For example, the at least one knowledge domain can be substantially similar to the knowledge domains 20, 22, 24 shown in FIG. 1.

At operation 310, a respective response is retrieved from each identified knowledge domain. At operation 312, in response to retrieving more than one respective response, feedback is transmitted to the cognitive switching logic to refine identifying the at least one knowledge domain until only one response is retrieved. Accordingly, in response to retrieving more than one respective response, following operation 312, the method 300 returns to operation 308. At operation 314, in response to retrieving no more than one respective response, the one response is presented to the user.

In at least one embodiment of the present disclosure, the method 300 further includes receiving user feedback from the user based on the presented response. Furthermore, in at least one embodiment of the present disclosure, the method 300 further includes refining the cognitive switching logic based on the user feedback.

In at least one embodiment of the present disclosure, refining the cognitive switching logic based on the user feedback includes modifying the identification of the context of the natural language information.

In at least one embodiment of the present disclosure, the cognitive switching logic uses a neural network to identify the at least one knowledge domain which contains a response to the message. For example, the neural network can be substantially similar to neural network 60, 70 shown in FIGS. 4-7. Furthermore, in at least one embodiment of the present disclosure, the neural network is trained with an initial set of natural language processing information for the at least one knowledge domain. Furthermore, in at least one embodiment of the present disclosure, the neural network is retrained based on at least one of the user feedback and the user persona information.

In at least one embodiment of the present disclosure, in response to receiving user feedback which includes an indication that the presented response is incorrect, the cognitive switching logic generates a penalizing factor to be utilized by the neural network.

Figure 8:
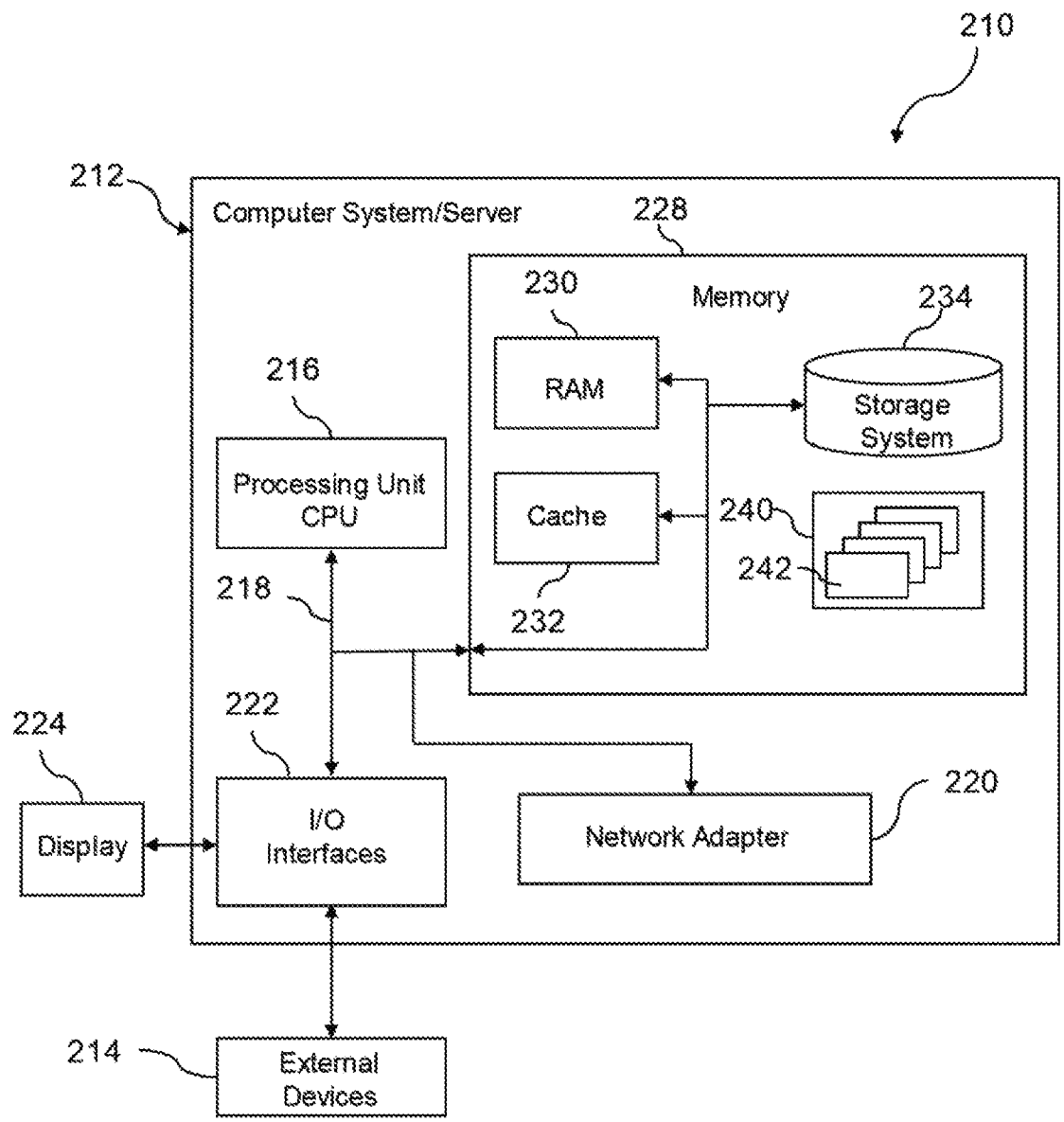
FIG. 8 depicts an example embodiment of a data processing system for executing a method, in accordance with embodiments of the present disclosure.

Referring now to FIG. 8, a schematic of an exemplary data processing system 210 according to at least one embodiment of the present disclosure is shown. Data processing system 210 is only one example of a suitable data processing system and is not intended to suggest any limitation as to the scope of use or functionality of embodiments of the present disclosure described herein. Data processing system 210 is capable of being implemented and/or performing any of the functionalities set forth herein above.

Data processing system 210 includes a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 212 in data processing system 210 is shown in the form of a general-purpose computing device. The components of computer system/server 212 may include, but are not limited to, one or more processors or processing units 216, a system memory 228, and a bus 218 that couples various system components, including system memory 228, to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the disclosure as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a predicted response to a user, the method comprising:
    training a neural network with an initial set of natural language information for a set of multiple knowledge domains of a domains model;
    retraining the neural network based on user feedback and user persona metadata to obtain a trained neural network for the set of multiple knowledge domains;
    receiving a message from a user, the message having unstructured natural language information;
    processing, using cognitive switching logic, the unstructured natural language information of the message and information from previous messages from the same user, wherein the cognitive switching logic is connected to the set of multiple knowledge domains of the domains model, and comprises the trained neural network;
    identifying, using the cognitive switching logic, a context of the unstructured natural language information of the message based on the information from the previous messages;
    identifying, using the cognitive switching logic, at least one knowledge domain of the multiple knowledge domains which contains a response to the message, based on the identified context of the unstructured natural language information of the message and on user persona information, wherein the cognitive switching logic includes the trained neural network to identify the at least one knowledge domain of the set of multiple knowledge domains of the domains model which contains a response to the message;
    retrieving a respective response from each identified knowledge domain;
    obtaining, by the cognitive switching logic, feedback, based on retrieving more than one respective response, to refine identifying the at least one knowledge domain until only one response is retrieved; and
    presenting the one response to the user.

2. The method of claim 1, further comprising:
    receiving user feedback from the user based on the presented response; and
    refining the cognitive switching logic based on the user feedback.

3. The method of claim 2, wherein refining the cognitive switching logic based on the user feedback includes modifying the identification of the context of the unstructured natural language information.

4. The method of claim 2, wherein:
    in response to receiving user feedback indicating that the presented response is incorrect, the cognitive switching logic generates a penalizing factor to be utilized by the neural network.

5. A computerized system for providing a predicted response to a user, the computerized system including a processor configured to perform a method, the method comprising:
    training a neural network with an initial set of natural language information for a set of multiple knowledge domains of a domains model;
    retraining the neural network based on user feedback and user persona metadata to obtain a trained neural network for the set of multiple knowledge domains;
    receiving a message from a user, the message having unstructured natural language information;
    processing, using cognitive switching logic, the unstructured natural language information of the message and information from previous messages from the same user, wherein the cognitive switching logic is connected to the set of multiple knowledge domains of the domains model, and comprises the trained neural network;
    identifying, using the cognitive switching logic, a context of the unstructured natural language information of the message based on the information from the previous messages;
    identifying, using the cognitive switching logic, at least one knowledge domain of the multiple knowledge domains which contains a response to the message, based on the identified context of the unstructured natural language information of the message and on user persona information, wherein the cognitive switching logic includes the trained neural network to identify the at least one knowledge domain of the set of multiple knowledge domains of the domains model which contains a response to the message;
    retrieving a respective response from each identified knowledge domain;
    obtaining, by the cognitive switching logic, feedback, based on retrieving more than one respective response, to refine identifying the at least one knowledge domain until only one response is retrieved; and
    presenting the one response to the user.

6. The computerized system of claim 5, the method further comprising:
    receiving user feedback from the user based on the presented response; and
    refining the cognitive switching logic based on the user feedback.

7. The computerized system of claim 6, wherein refining the cognitive switching logic based on the user feedback includes modifying the identification of the context of the unstructured natural language information.

8. The computerized system of claim 7, wherein:
    in response to receiving user feedback indicating that the presented response is incorrect, the cognitive switching logic generates a penalizing factor to be utilized by the neural network.

9. A computer program product comprising a computer readable storage medium having program instructions embodied therewith, the program instructions being executable by a computer system to cause the computer system to perform a method for providing a predicted response to a user, the method comprising:

training a neural network with an initial set of natural language information for a set of multiple knowledge domains of a domains model;

retraining the neural network based on user feedback and user persona metadata to obtain a trained neural network for the set of multiple knowledge domains;

receiving a message from a user, the message having unstructured natural language information;

processing, using cognitive switching logic, the unstructured natural language information of the message and information from previous messages from the same user, wherein the cognitive switching logic is connected to the set of multiple knowledge domains of the domains model, and comprises the trained neural network;

identifying, using the cognitive switching logic, a context of the unstructured natural language information of the message based on the information from the previous messages;

identifying, using the cognitive switching logic, at least one knowledge domain of the multiple knowledge domains which contains a response to the message, based on the identified context of the unstructured natural language information of the message and on user persona information, wherein the cognitive switching logic includes the trained neural network to identify the at least one knowledge domain of the set of multiple knowledge domains of the domains model which contains a response to the message;

retrieving a respective response from each identified knowledge domain;

obtaining, by the cognitive switching logic, feedback, based on retrieving more than one respective response, to refine identifying the at least one knowledge domain until only one response is retrieved; and presenting the one response to the user.

10. The computer program product of claim 9, the method further comprising:

receiving user feedback from the user based on the presented response; and refining the cognitive switching logic based on the user feedback.

11. The computer program product of claim 10, wherein refining the cognitive switching logic based on the user feedback includes modifying the identification of the context of the unstructured natural language information.

12. The computer program product of claim 11, wherein:

in response to receiving user feedback indicating that the presented response is incorrect, the cognitive switching logic generates a penalizing factor to be utilized by the neural network.

\* \* \* \* \*